(No Model.)

J. H. COLE.
DOUBLE TURNING SHOVEL AND COLTER.

No. 503,123. Patented Aug. 15, 1893.

Witnesses.
Geo. H. Collins
Chauncey Collins Jr.

Inventor.
John H. Cole

UNITED STATES PATENT OFFICE.

JOHN H. COLE, OF TYLERTOWN, MISSISSIPPI.

DOUBLE TURNING SHOVEL AND COLTER.

SPECIFICATION forming part of Letters Patent No. 503,123, dated August 15, 1893.

Application filed October 1, 1892. Serial No. 447,575. (No model.)

*To all whom it may concern:*

Be it known that I, JOHN H. COLE, a citizen of the United States, residing at Tylertown, in the county of Pike and State of Mississippi, have invented a new and useful Double Turning Shovel and Colter, of which the following is a specification.

My invention relates to a combined double turning shovel and colter, united to form a single implement, the objects in view being simplicity, compactness, cheapness and strength of construction.

My invention is fully described hereinafter.

Figure 1:
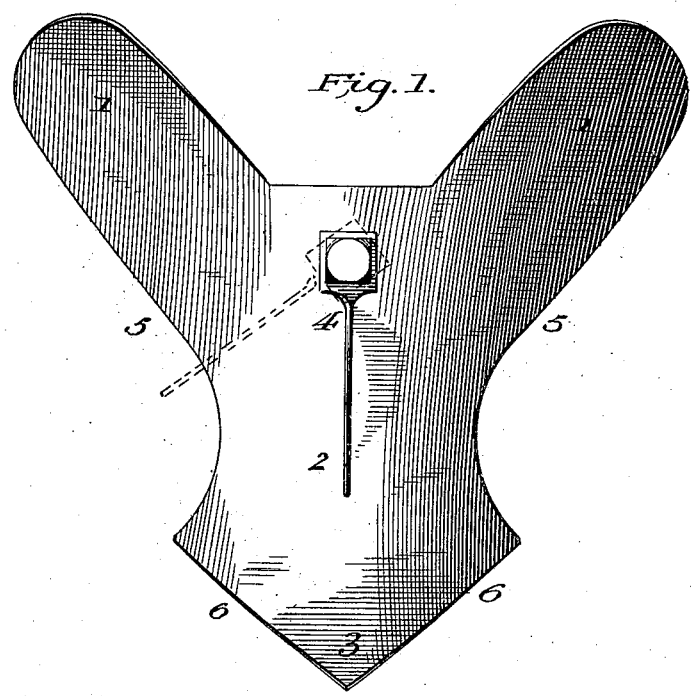
Figure 2:
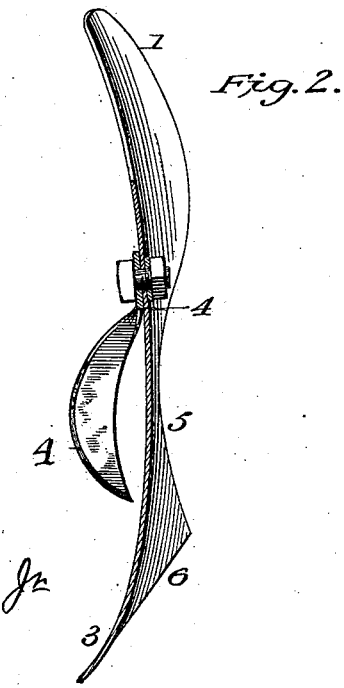

Figure 1, shows a front view of the double turning shovel and colter. Fig. 2 is a transverse lateral view of the same in section.

1. 1. are the wings of the double turning shovel which rise above the upper central edge of the plow and slope or curve rearwardly.

2 is the central part of the face of the plow which is bent or concave from point —3— to 4, and sloping gradually to sides or edges of the plow 5, 5. The point, 3 is diamond shaped, the edges of which, 6 6, are beveled.

Fig. 2, shows the colter (4) attached, which is a circular or crescent shaped blade, the front edge of which is sharp or beveled. This colter is arranged to be turned to one side to serve as a fender, as shown in dotted lines in Fig. 1.

I claim—

1. A double shovel plow formed with the diamond point 3, the wings 1 rising above the central portion, said central portion being vertically concave and slightly convex across the face of the shovel, said center narrowed above the cutting edge, thence expanding into the wings, substantially as shown and described.

2. The double shovel plow formed as described and shown in combination with the crescent-shaped colter 4, secured to the plow and adapted to be turned to one side to serve as a fender, substantially as shown and described.

JOHN H. COLE.

Witnesses:
JOHN W. WILLIS,
WILLIAM SANDIFER.